United States Patent Office 3,238,161
Patented Mar. 1, 1966

3,238,161
FURAN CARBOXYLIC ACID-MODIFIED ALKYD RESIN AND PROCESS OF MAKING THE SAME
Victor Frederick Jenkins, 2 Walden Road, Hornchurch, Essex, England; Ronald James Wicker, Woodstock, Highlands Ave., Brentwood, Essex, England; Nevison George Boast, 77 Tavistock Gardens, Seven Kings, Ilford, Essex, England; and Edward William Hoy, 2 Ash Grove, Vine Farm Estate, Wivenhoe, Colchester, England
No Drawing. Filed Oct. 22, 1962, Ser. No. 232,289
7 Claims. (Cl. 260—22)

The invention relates to alkyd resins and to a method for their production.

Alkyd resins are the product of reaction of a polyhydric alcohol with a polybasic acid and are well-known. Oil-modified alkyd resins, that is, alkyd resins modified with drying and semi-drying fatty acids, are also well-known.

In Canadian patent specification No. 590,551 there is described an alkyd resin comprising the resinous product of the esterification of polyhydric alcohol, fatty acid, benzoic acid and at least 0.5 mol of organic dibasic acid per mol of polyhydric alcohol, the polyhydric alcohol being selected from pentaerythritol, polypentaerythritol, trimethylolpropane, trimethylol ethane and mixtures thereof, and the molar amount of benzoic acid constituting at least 20% of the total molar amount of fatty acid and benzoic acid. The term "fatty acid" is used as a generic term for fatty acids which occur in nature, generally as glycerides, and most of which contain from 12 to 18 carbon atoms in the molecule. It is stated in the Canadian specification that such benzoic acid-modified alkyd resins have faster bodying rates and shorter drying times than the oil-modified alkyd resins.

According to the invention, there is provided a modified alkyd resin comprising the resinous product of the esterification of a polyhydric alcohol, unsaturated fatty acid, a dicarboxylic acid or its anhydride and a furan carboxylic acid of the formula:

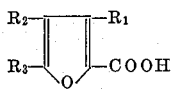

in which $R_1$, $R_2$ and $R_3$ are members of the group consisting of hydrogen atoms, methyl and ethyl groups, the molar amount of the furan carboxylic acid constituting at least 5% of the total molar amount of fatty acid and furoic acid.

Preferably not less than 0.5 mol of dicarboxylic acid or its anhydride, advantageously phthalic acid or phthalic anhydride and/or isophthalic acid is used per mol of polyhydric alcohol. The phthalic acid, or phthalic anhydride or isophthalic acid may in part be replaced by an aliphatic dicarboxylic acid, for example, adipic acid, sebacic acid, succinic anhydride, fumaric acid or, in particular, maleic acid or maleic anhydride.

The molar amount of furan carboxylic acid is advantageously not more than 80% of the total molar amount of fatty acid and furan carboxylic acid. The furan carboxylic acid may be a mixture of two or more of the furan carboxylic acids identified by the given formula but it is preferred to use furoic acid alone without admixture of a substituted furoic acid.

The polyhydric alcohol used is not limited to those specified in the Canadian specification hereinbefore referred to. Thus it may be one of those polyhydric alcohols or a mixture of two or more of them, or it may be one or more other polyhydric alcohols, for example, ethylene glycol, propylene glycol, glycerol, tetramethylol cyclohexanol, mannitol and/or sorbitol with or without one or more of the polyhydric alcohols specified in Canadian Patent No. 590,551.

One or more unsaturated fatty acids may be used, particularly those containing from 12 to 22 carbon atoms in the molecule. The unsaturated fatty acids may contain more than one carbon-to-carbon double bond in the molecule. It will be understood that one or more saturated fatty acids may also be present.

The resins of the invention have shorter drying times and/or faster bodying rates than the corresponding benzoic acid-modified resins.

The alkyd resins of the invention may be produced by heating and reacting together the fatty acid and furoic acid either before or concurrently with reaction with the polyhydric alcohol and/or the dibasic acid in the manner disclosed with respect to the benzoic acid modified resins in Canadian Patent No. 590,551.

According to the invention furthermore, there is provided a composition comprising the furoic-modified alkyd resin and a pigment. The gloss retention of a film of such pigmented composition or paint is better than that of a similar composition in which the furoic-modified resin is replaced by the corresponding benzoic-modified resin.

It appears that benzoic acid when used as a modifier of an alkyd resin merely functions as a chain-stopper. With furan carboxylic acid, however, it is believed that the acid takes part in the auto-oxidative mechanism of polymerisation; this is supported by the amount of benzene-insoluble material in films cast from the furoic-modified alkyd resin and by the fact that the poor drying properties of fatty acids containing only one carbon-to-carbon double bond in the molecule is improved by the incorporation of furoic acid in the resin. Thus, although furoic acid is not a recognised "drying oil" acid, its modifying properties in alkyd resins appear to be quite different from those of benzoic acid.

The invention is illustrated in the following examples.

EXAMPLE 1

Two alkyd resins were prepared using the following recipes:

| Alkyd | Furoic Acid, gm. | Soyabean Fatty acid, gm. | Phthalic anhydride, gm. | Pentaerythritol, gm. |
|---|---|---|---|---|
| I | 81 | 201.5 | 97.1 | 110 |
| II | | 403 | 97.1 | 110 |

To each reaction mixture 25 mls. of xylene was added and the mixture heated to 220° C. in a stirred apparatus having an inlet for nitrogen and a side arm for the removal of entrained water of esterification.

Samples of each alkyd resin were removed periodically for determination of acid value and viscosity. Results are shown in the following table:

| Reaction time | Viscosity [1] | | Acid value | |
|---|---|---|---|---|
| | Alkyd I | Alkyd II | Alkyd I | Alkyd II |
| 1½ hrs | 16.2 | | | |
| 3 hrs | 20.0 | 6.5 | 12 | 10.7 |
| 5 hrs | 21.9 | 6.8 | 4 | |
| 9 hrs | 21.9 | 7 | 0.5 | |
| 11 hrs | 23 | 7.5 | 0.5 | |
| 14 hrs | | 7.5 | | 0.5 |
| 21 hrs | | 7.5 | | 0.5 |

[1] Time of flow in seconds of a bubble in a 60% w./w. solution in xylene when placed in a tube of dimensions 40 cm. x 0.8 cm. I.D. at 23° C.

The samples obtained after 11 and 21 hours respectively from Alkyd I and Alkyd II were dissolved in xylene and 0.002″ films cast, and air-dried using 0.05% cobalt metal and 0.5% lead (based on weight of alkyd) as driers, the driers being added in the form of their naphthenates. After 48 hours at room temperature, the films had Sward rocker hardnesses of 9 and 6 respectively. Immersion of the films in 3% aqueous sodium hydroxide showed that whereas the unmodified alkyd film was completely destroyed in 1½ hours, the furoic acid modified alkyd showed only slight attack after 24 hours, and was still undestroyed after 100 hours.

A similar alkyd prepared under the same reaction conditions in which furoic acid was replaced by an equimolar amount of benzoic acid gave a viscosity after 11 hours of 12.2 secs. The Sward rocker hardness of an air-dried film of this material, after addition of the same drier in the same proportion as in Alkyds I and II, was 7 and it was slightly attacked by 3% aqueous sodium hydroxide in 3 hours.

EXAMPLE 2

Two alkyds were prepared from the recipes given in Table A.

*Table A*

| Constituent | Alkyd III | Alkyd IV |
|---|---|---|
| Pentaerythritol, grams | 110 | 110 |
| Phthalic anhydride, grams | 97 | 97 |
| Oleic acid, grams | 210 | 210 |
| Furoic acid, grams | 81 | |
| Benzoic acid, grams | | 88 |

In both cases the reactants were placed in a vessel equipped with stirrer and a device for removing water of esterification, the water being entrained by the use of xylene as entraining agent. The reactions were carried out under nitrogen.

The reactions were carried out at 240° C. until the acid value of each of the two products was 10.

60 parts wt. of each alkyd were dissolved in 40 parts wt. of white spirit, and to each solution was added sufficient cobalt naphthenate solution to give a cobalt metal concentration of 0.05% (calculated on the weight of alkyd). Films of the two products of thickness 0.002″ were left to dry at 23° C., and were examined for hardness (by means of a Sward rocker hardness meter) and freedom from tack. The results are shown in Table B:

*Table B*

| Time | Sward hardness | | Tack-free time | |
|---|---|---|---|---|
| | Alkyd III | Alkyd IV | Alkyd III | Alkyd IV |
| 72 hrs | 29 | 16 | 16 | Did not dry tack-free. |
| 7 days | 51 | 23 | | |
| 33 days | 57 | 23 | | |

The Sward rocker hardness and its use are described in "Physical and Chemical Examinations of Paints, Varnishes, Lacquers and Colors," H. A. Gardner and G. G. Sward, 10th edition, May 1946, distributed by Henry A. Gardner Laboratory, Inc.

EXAMPLE 3

Three alkyds were prepared by the method described in Example 2 from the recipes given in Table C:

*Table C*

| Constituent | Alkyd V | Alkyd VI | Alkyd VII |
|---|---|---|---|
| Pentaerythritol, gm | 110 | 110 | 110 |
| Phthalic anhydride, gm | 97 | 97 | 97 |
| Soyabean fatty acid, gm | 408 | 205 | 205 |
| Furoic acid, gm | | 81 | |
| Benzoic acid, gm | | | 88 |

After reaction, the three alkyds were each dissolved in xylene to give 70% w./w. solutions. 150 parts by weight of each of the three solutions were mixed with 75 parts by weight of rutile titanium oxide and ball-milled for twenty-four hours. The resultant paints were mixed with cobalt naphthenate so as to give a cobalt metal concentration of 0.05% calculated on the weight of the alkyd.

Films of 0.002 inch thickness were cast onto aluminium sheets and after allowing to dry for 14 days, were exposed in a weatherometer for 1,000 hours. After this time, the films of the paints based on Alkyds V and VII showed an almost complete absence of gloss whilst the gloss of the films of the paint based on Alkyd VI was almost unaffected.

EXAMPLE 4

Two alkyds were prepared from the following materials:

Alkyd VIII: Gm.
  Soyabean fatty acid _____ 252
  Furoic acid _____ 67
  Phthalic anhydride _____ 37
  Pentaerythritol _____ 70
Alkyd IX:
  Soyabean fatty acid _____ 252
  Benzoic acid _____ 73
  Phthalic anhydride _____ 37
  Pentaerythritol _____ 70

Both alkyds were prepared by heating to 270–280° C. under an atmosphere of nitrogen until the acid values had fallen to 2–3.

Each was then diluted with xylene to give 60% solutions and pigmented with titanium oxide to give a pigment/vehicle ratio of 0.8:1. Cobalt naphthenate solution was added to give a concentration of 0.05% cobalt as metal based on the weight of the alkyd. Films of these paints of 0.001″ thickness were cast on glass plates and examined for the following properties:

| Property | Alkyd VIII | Alkyd IX |
|---|---|---|
| Sward rocker hardness after 21 days at 25° C. and 60% relative humidity | 9 | 3 |
| Pencil hardness after 21 days | B | 5B |
| Percent material insoluble in benzene after 7 days [1] | 58 | 13 |

[1] This was determined by extracting the unpigmented film with boiling benzene in a Soxhlet extraction apparatus.

EXAMPLE 5

Another pair of alkyds was prepared similar to those in Example 4, but in this case linseed oil fatty acids were used instead of soyabean fatty acids. These alkyds, Alkyds X and XI, were tested in a similar way and the results obtained are shown in Table D.

*Table D*

| Property | Furoic-modified Alkyd X | Benzoic-modified Alkyd XI |
|---|---|---|
| Sward rocker hardness after 21 days | 23 | 5 |
| Pencil hardness after 21 days | 2H | F |
| Benzene-inextractable material after 7 days, percent | 78.4 | 41.5 |

The differences between the benzene-inextractible material in the furoic alkyds and benzoic alkyds of Examples 4 and 5 tend to lead to the conclusion that furoic acid takes part in the drying process of the film.

EXAMPLE 6

Four alkyds were prepared from the recipes given in Table E.

Table E

| Constituents | Alkyd XII | Alkyd XIII | Alkyd XIV | Alkyd XV |
|---|---|---|---|---|
| Pentaerythritol, gm | 136 | 136 | 136 | 136 |
| Phthalic anhydride, gm | 148 | 148 | 148 | 148 |
| Tall oil fatty acid, gm | 405 | 405 | | 560 |
| Linseed oil fatty acid, gm | | | 405 | |
| Furoic acid, gm | 63 | | | |
| Benzoic acid, gm | | 69 | 69 | |

In each case the reactants were placed in a vessel equipped with stirrer and a device for removing water of esterification the water being entrained by the use of xylene as entraining agent.

Each reaction was carried out under nitrogen at 240° C. until the acid value of each of the four products was 20. 50 parts by weight of each alkyd were dissolved in 50 parts by weight of white spirit, and to each solution was added sufficient cobalt naphthenate solution to give a cobalt metal concentration of 0.05% (calculated on the weight of alkyd).

Films of the four products of thickness 0.002" were left to dry at ambient temperature and were examined for degree of cure (benzene-inextractables) after 4 days ageing), hardness (by means of pencil and Sward rocker hardness after 4 days ageing) and freedom from tack.

The results are shown in Table F.

Table F

| Test | Alkyd XII | Alkyd XIII | Alkyd XIV | Alkyd XV |
|---|---|---|---|---|
| Percent Benzene-inextractable material | 57 | 25 | 67 | 15 |
| Sand-dry Time,[1] hrs | 6 | >48 | 3 | >48 |
| Tack-free Time, hrs | 72 | >72 | 20 | >72 |
| Sward rocker hardness | 13 | 6 | 16 | 2 |
| Pencil hardness | HB | 3B | HB | 6B |

[1] Sand-dry time is the time required for the film to dry sufficiently to permit sand which has been sprinkled over the film to be removed completely by brushing with a camel hair brush.

The four alkyd solutions were pigmented with rutile titanium dioxide using a pigment/alkyd ratio of 0.8:1 by weight. The viscosities of the resultant paints were adjusted by dilution to 80 seconds, using a Ford cup type "B" at 20° C.

Films of the four paints of thickness 0.002" were left to dry at 23° C. and were examined for freedom of tack and hardness (by means of pencil and Sward rocker hardness meter). The results are shown in Table G.

Table G

| Test | Alkyd XII | Alkyd XIII | Alkyd XIV | Alkyd XV |
|---|---|---|---|---|
| Tack-free time, hrs | 65 | >72 | 18 | >72 |
| Sand-dry time, hrs | 3 | >48 | 2 | >48 |
| Pencil hardness | H | 3B | H | 3B |
| Sward rocker hardness | 16 | 7 | 20 | 6 |

The results show that the benzoic-tall oil Alkyd XIII is little better than the tall oil Alkyd XV whereas the furoic-tall oil Alkyd XII is very much better than Alkyd XV and approximates in quality to the benzoic-linseed oil Alkyd XIV.

EXAMPLE 7

Two alkyds were prepared by the method of Example 2 from the recipes given in Table H.

Table H

| Constituents | Alkyd XVI | Alkyd XVII |
|---|---|---|
| Dehydrated castor oil, gm | 252 | 252 |
| Furoic acid, gm | 68 | |
| Benzoic acid, gm | | 73 |
| Phthalic anhydride, gm | 37 | 37 |
| Pentaerythritol, gm | 70 | 70 |

60 parts by weight of each alkyd were dissolved in 40 parts by weight of white spirit and to each solution was added sufficient cobalt naphthenate solution to give a cobalt metal concentration of 0.05% (calculated on the weight of alkyd).

Films of the two products of thickness 0.002" were left to dry at 23° C. and were examined for degree of cure (benzene-inextractable material after 4 days ageing) and freedom from tack. The results are shown in Table I.

Table I

| Test | Alkyd XVI | Alkyd XVII |
|---|---|---|
| Percent benzene-inextractable material | 85 | 54 |
| Sand-dry time, hrs | 1½ | 4 |
| Tack-free time, hrs | 3 | 8 |
| Pencil hardness | 2H | H |
| Sward rocker hardness | 19 | 17 |

EXAMPLE 8

Two alkyds were prepared from the recipe given in Table I.

Table J

| Constituents | Alkyd XVIII | Alkyd XIX |
|---|---|---|
| Soyabean oil, gm | 88 | 88 |
| Benzoic acid, gm | | 33 |
| Furoic acid, gm | 33 | |
| Glycerol, gm | 46 | 46 |
| Phthalic anhydride, gm | 89 | 89 |
| Litharge, gm | 0.14 | 0.14 |

The triglyceride, glycerol and litharge were in each case heated at 230° C. in a vessel equipped with a stirrer until the product was soluble in methanol. The remaining reactants were then added and the water of esterification removed by using xylene as the entraining agent. The reaction was carried out at 240° C., under nitrogen, until the acid values of both products were below 10.

60 parts by weight of each alkyd were dissolved in 40 parts by weight of white spirit, and to each solution was added sufficient cobalt naphthenate to give a cobalt metal concentration of 0.05% (calculated on the weight of alkyd).

Films of the solutions of thickness 0.002" were left to dry at 23° C. and were examined for degree of cure (benzene-inextractable after 4 days ageing), hardness (by means of pencil and Sward rocker hardness meter) and freedom from tack.

The results are as shown in Table K:

Table K

| Test | Alkyd XVIII | Alkyd XIX |
|---|---|---|
| Percent benzene-inextractable-material | 75 | 50 |
| Sand-dry time, mins | 100 | 300 |
| Tack-free time, hrs | 4 | 8 |
| Pencil hardness | 2H | H |
| Sward rocker hardness | 17 | 14 |

EXAMPLE 9

Two alkyds were prepared from the recipes given in Table L.

Table L

| Constituents | Alkyd XX | Alkyd XXI |
|---|---|---|
| Pentaerythritol, gm | 110 | 110 |
| Isophthalic acid, gm | 107 | 107 |
| Tall oil fatty acids, gm | 210 | 210 |
| Furoic acid, gm | 81 | |
| Benzoic acid, gm | | 88 |

In both cases the reactants were placed in a vessel equipped with stirrer and a device for removing water of esterification, the water being entrained by the use of xylene as entraining agent. The reactions were carried out under nitrogen at 240° C. until the acid value of each of the two products was 10.

60 parts by weight of each alkyd were dissolved in 40 parts by weight of white spirit, and to each solution was added sufficient cobalt naphthenate solution to give a cobalt metal concentrations of 0.05% (calculated on the weight of alkyd). Films of the two products of thickness 0.002″ were left to dry at 23° C. and were examined for hardness (by means of a Sward rocker hardness meter) and freedom from tack. The results are shown in Table M.

Table M

| Time | Sward hardness | | Tack-free time | |
|---|---|---|---|---|
| | Alkyd XX | Alkyd XXI | Alkyd XX | Alkyd XXI |
| 72 hrs | 36 | 20 | 10 | 16 |

We claim:

1. A modified alkyd resin which is the resinous product of esterification of at least one polyhydric alcohol selected from the group consisting of pentaerythritol, polypentaerythritol, trimethylolpropane, trimethylolethane, ethyleneglycol, propyleneglycol, glycerol, tetramethylolcyclohexanol, mannitol, and sorbitol, with an acid component comprising (i) at least one unsaturated fatty acid containing from 12 to 22 carbon atoms in the molecule, (ii) at least one member of the group consisting of dicarboxylic acids and anhydrides of dicarboxylic acids selected from the group consisting of phthalic acid, phthalic anhydride, isophthalic acid, and mixtures of at least one of the aforementioned compounds with at least one compound of the group consisting of adipic acid, sebacic acid, succinic acid, succinic anhydride, fumaric acid, maleic acid, and maleic anhydride, and (iii) at least one furan carboxylic acid which is a member of the group of acids having the general formula

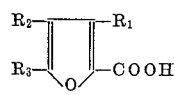

in which $R_1$, $R_2$, and $R_3$ are members of the class consisting of hydrogen atoms, methyl and ethyl groups, the molar amount of furan carboxylic acid constituting at least 5 percent of the total molar amount of fatty acid and furan carboxylic acid.

2. An alkyd resin comprising the resinous product of esterification of polyhydric alcohol selected from the group consisting of pentaerythritol, polypentaerythritol, trimethylolpropane, trimethylolethane, ethyleneglycol, propyleneglycol, glycerol, tetramethylol-cyclohexanol, mannitol, and sorbitol; at least one member of the class consisting of semi-drying oil fatty acids and drying oil fatty acids, said acids containing from 12 to 22 carbon atoms in the molecule, furoic acid and at least one member of the group consisting of phthalic anhydride, phthalic acid, isophthalic acid, and mixtures of at least one of the aforementioned compounds with at least one compound of the group consisting of adipic acid, sebacic acid, succinic acid, succinic anhydride, fumaric acid, maleic acid, and maleic anhydride, the molar amount of furoic acid constituting from 5 percent to 80 percent of the total amount of furoic acid and fatty acids.

3. An alkyd resin comprising the resinous product of esterification of pentaerythritol, a drying oil fatty acid containing from 12 to 22 carbon atoms in the molecule, furoic acid, and at least one member of the group consisting of phthalic anhydride, phthalic acid, isophthalic acid, and mixtures of at least one of the aforementioned compounds with at least one compound of the group consisting of adipic acid, sebacic acid, succinic acid, succinic anhydride, fumaric acid, maleic acid, and maleic anhydride, the molar amount of furoic acid constituting from 5 to 80 percent of the total molar amount of furoic acid and fatty acids.

4. An alkyd resin comprising the resinous product of esterification of polyhydric alcohol selected from the group consisting of pentaerythritol, polypentaerythritol, trimethylolpropane, trimethylolethane, ethyleneglycol, propyleneglycol, glycerol, tetramethylol-cyclohexanol, mannitol, and sorbitol; furoic acid, drying oil fatty acids selected from the group consisting of soyabean fatty acids, tall oil fatty acid, dehydrated castor oil and linseed oil fatty acid; and phthalic anhydride, the molar amount of furoic acid constituting from 5 percent to 80 percent of the total molar amount of furoic acid and fatty acid.

5. An alkyd resin comprising the resinous product of esterification of pentaerythritol with furoic acid, at least one unsaturated fatty acid containing from 12 to 22 carbon atoms in the molecule, and phthalic anhydride, the molar amount of furoic acid constituting at least 5 percent of the total molar amount of furoic acid and fatty acid and said phthalic anhydride constituting at least 0.5 mol per mol of pentaerythritol.

6. In a process for the production of an alkyd resin comprising the esterification of a polyhydric alcohol selected from the group consisting of pentaerythritol, polypentaerythritol, trimethylolpropane, trimethylolethane, ethyleneglycol, propyleneglycol, glycerol, tetramethylolcyclohexanol, mannitol, and sorbitol, with an acidic component comprising drying oil fatty acids containing from 12 to 22 carbon atoms in the molecule and at least one member of the group consisting of dicarboxylic acids and anhydrides of dicarboxylic acids selected from the group consisting of phthalic acid, phthalic anhydride, isophthalic acid, and mixtures of at least one of the aforementioned compounds with at least one compound of the group consisting of adipic acid, sebacic acid, succinic acid, succinic anhydride, fumaric acid, maleic acid, and maleic anhydride, the step of modifying the alkyd resin by including in the acidic component furoic acid in a molar amount constituting from 5 percent to 80 percent of the total molar amount of fatty acid and furoic acid.

7. In the process for the production of an alkyd resin comprising the esterification of a polyhydric alcohol selected from the group consisting of pentaerythritol, polypentaerythritol, trimethylolpropane, trimethylolethane, ethyleneglycol, propyleneglycol, glycerol, tetramethylolcyclohexanol, mannitol, and sorbitol, with an acidic component including at least one member of the group consisting of dicarboxylic acids and anhydrides of dicarboxylic acids selected from the group consisting of phthalic acid, phthalic anhydride, isophthalic acid, and mixtures of at least one of the aforementioned compounds with at least one compound of the group consisting of adipic acid, sebacic acid, succinic acid, succinic anhydride, fumaric acid, maleic acid, and maleic anhydride, the step of modifying the alkyd resin by including in the acidic component the reaction product of an unsaturated fatty acid containing from 12 to 22 carbon atoms in the molecule and a furan carboxylic acid which is a member of the group of acids having the general formula

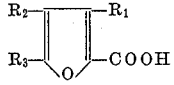

in which $R_1$, $R_2$, and $R_3$ are members of the class consisting of hydrogen atoms, methyl and ethyl groups.

References Cited by the Examiner

UNITED STATES PATENTS

| | | | |
|---|---|---|---|
| 1,860,098 | 5/1932 | Jaeger | 260—843 |
| 2,915,488 | 12/1959 | Kraft et al. | 260—22 |

FOREIGN PATENTS 590,551  1/1960  Canada.

LEON J. BERCOVITZ, *Primary Examiner.*

FRED E. McKELVEY, *Assistant Examiner.*